US008630086B2

(12) United States Patent
Zhao et al.

(10) Patent No.: US 8,630,086 B2
(45) Date of Patent: Jan. 14, 2014

(54) HINGED ELECTRONIC DEVICE

(75) Inventors: Guan-Dong Zhao, Shenzhen (CN); He-Li Wang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/568,709

(22) Filed: Aug. 7, 2012

(65) Prior Publication Data

US 2013/0271899 A1    Oct. 17, 2013

(30) Foreign Application Priority Data

Apr. 16, 2012 (CN) .......................... 2012 1 0109946

(51) Int. Cl.
*H05K 5/00* (2006.01)
*H05K 7/00* (2006.01)
*G06F 1/16* (2006.01)

(52) U.S. Cl.
USPC ............ 361/679.28; 361/679.26; 361/679.27; 361/679.29

(58) Field of Classification Search
USPC ............ 361/679.28, 679.27, 679.29, 679.26, 361/679.02
See application file for complete search history.

(56) References Cited

U.S. PATENT DOCUMENTS

| 5,335,142 | A | * | 8/1994 | Anderson | 361/679.07 |
| 6,091,601 | A | * | 7/2000 | Schlesener et al. | 361/679.28 |
| 6,694,569 | B2 | * | 2/2004 | Chien et al. | 16/367 |
| 6,694,570 | B2 | * | 2/2004 | Chen | 16/367 |
| 7,787,242 | B2 | * | 8/2010 | Schwager et al. | 361/679.28 |
| 2001/0012920 | A1 | * | 8/2001 | Ren et al. | 600/587 |

* cited by examiner

*Primary Examiner* — Anthony Haughton
(74) *Attorney, Agent, or Firm* — Altis Law Group, Inc.

(57) ABSTRACT

An electronic device includes a first component defining at least one through hole, a hinge defining at least one round hole corresponding to the at least one through hole, and a fixing mechanism for securing the hinge to the first component. The fixing mechanism includes a latching member and at least one fixing member capable of extending through the at least one through hole and the at least one round hole. The latching member defines at least one fixing hole corresponding to the at least one round hole. When the at least one fixing member extends through the at least one round hole and the at least one through hole, the at least one fixing hole receives an end of the at least fixing member to secure the hinge to the first component.

12 Claims, 5 Drawing Sheets

HINGED ELECTRONIC DEVICE

BACKGROUND

1. Technical Field

The present disclosure relates to electronic devices, and particularly to an electronic device having a hinge.

2. Description of Related Art

Electronic devices, such as notebook computers, include a main body, a display, and a hinge for rotatably coupling the display to the main body. The hinge is secured to the main body and/or the display by hot-melting. However, during hot-melting, high temperatures may cause damage to the electronic device.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
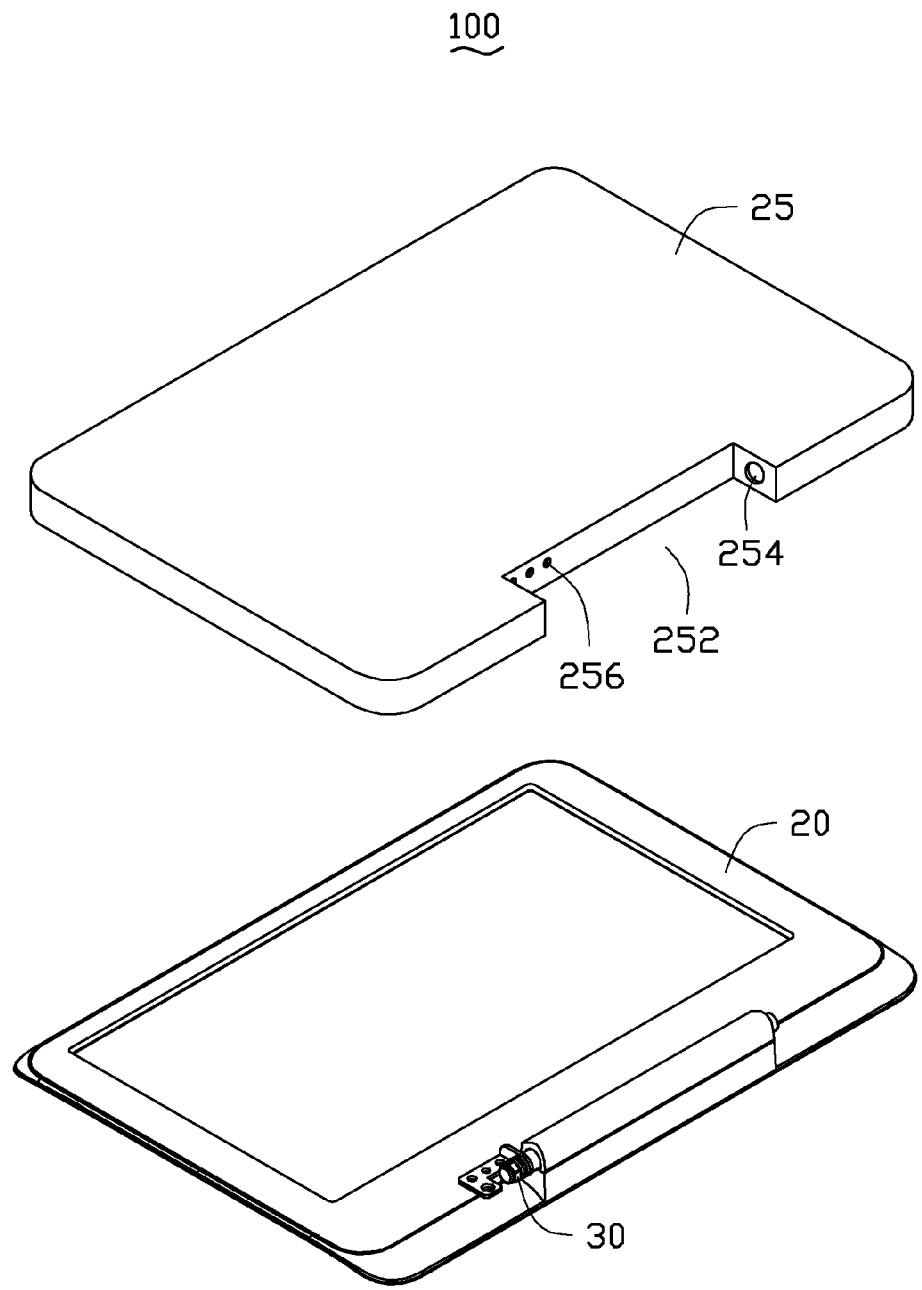
FIG. 1 is a perspective view of an electronic device in accordance with an embodiment.

Referring to FIG. 1, an electronic device 100 is shown. The electronic device 100 includes a first component 20, a second component 25 rotatably coupled to the first component 20, a connecting mechanism 30 for rotatably connecting the second component 25 to the first component 20, and a fixing mechanism 40 for securing the connecting mechanism 30 to the first component 20. In the embodiment, the electronic device 100 is a notebook computer, the first component 20 is for receiving a power supply, mother board, DVD drive, and other electronic components (not shown), and the second component 25 is the display of the notebook computer.

Figure 2:
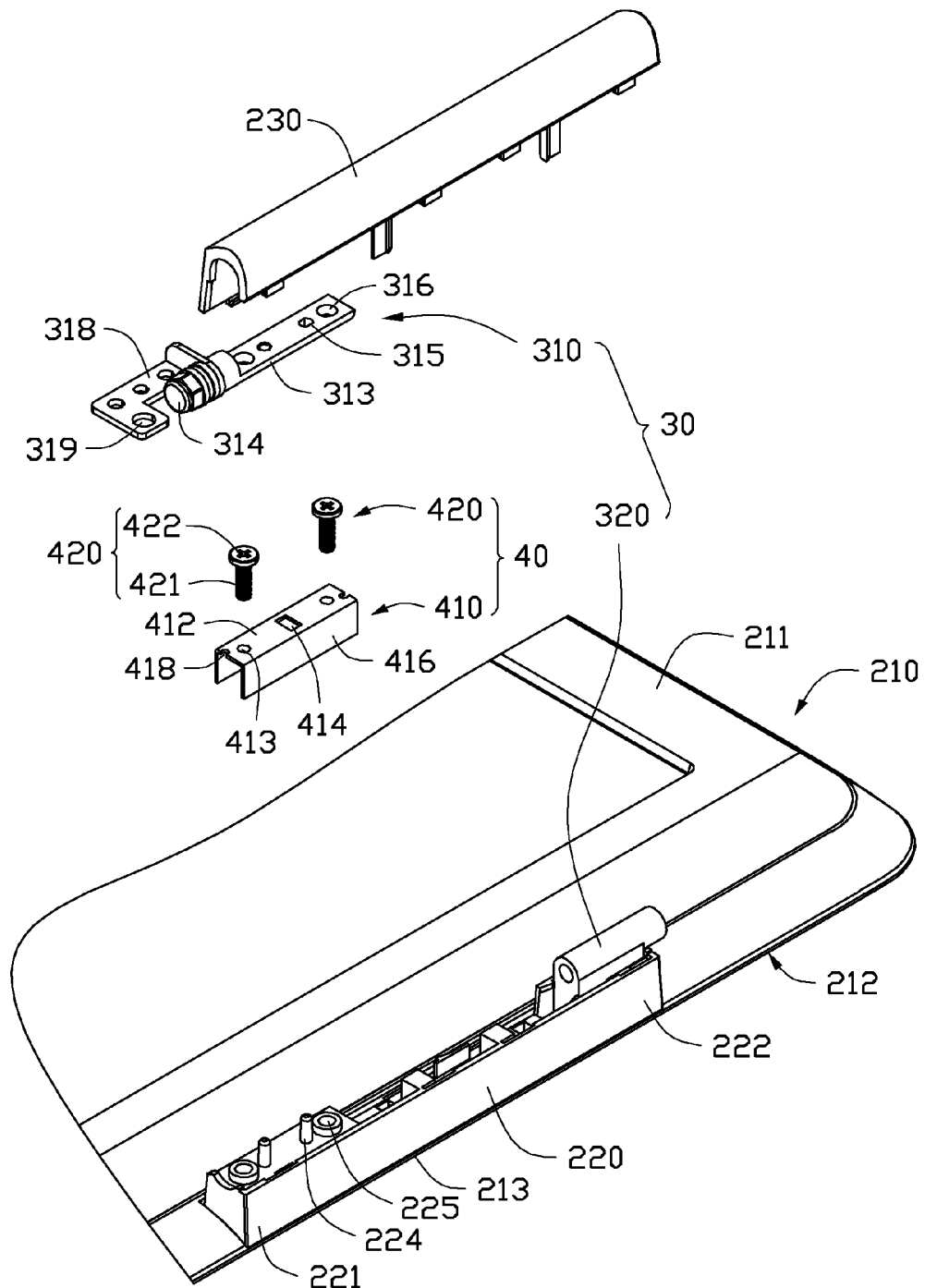
FIG. 2 is a partially disassembled view of the electronic device of FIG. 1.
Figure 3:
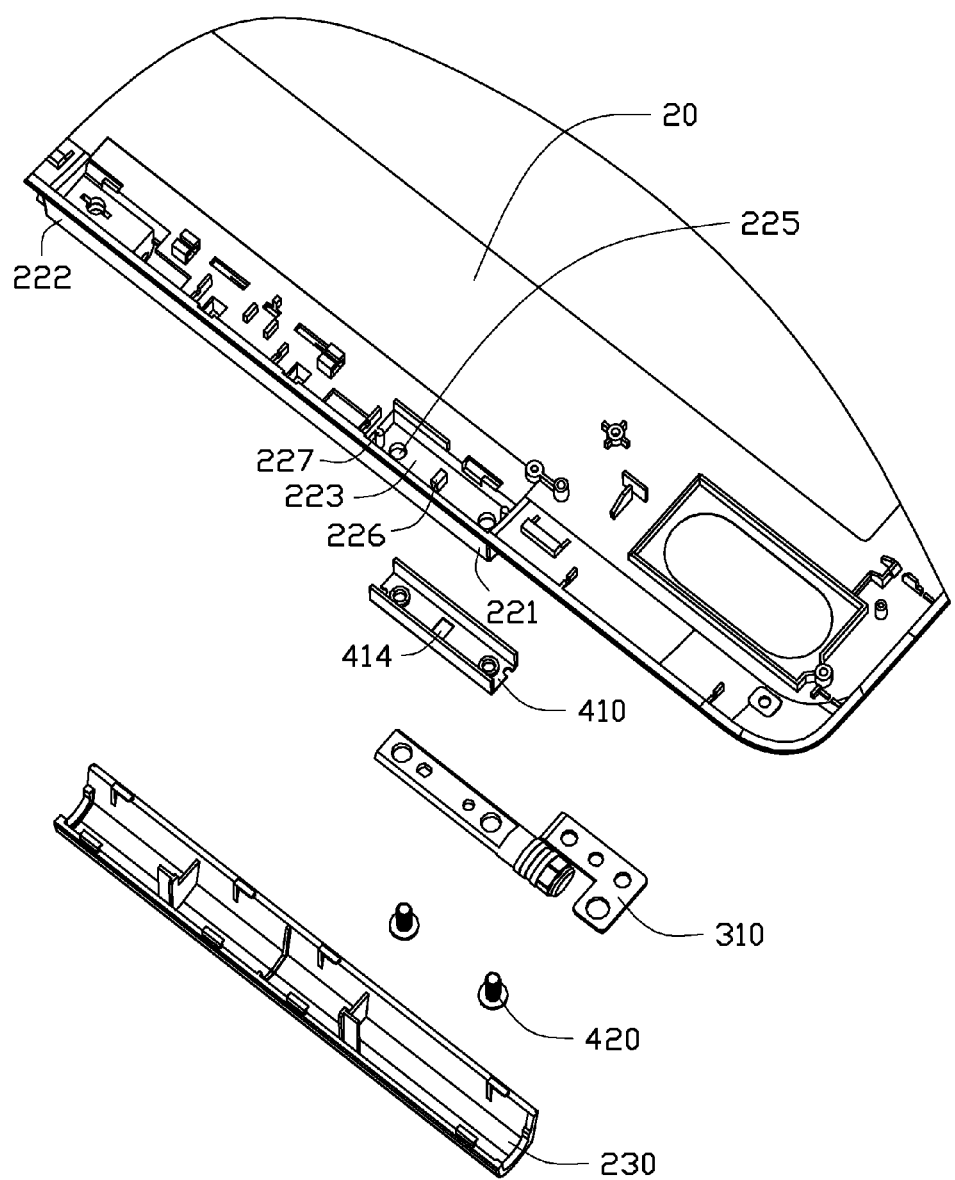
FIG. 3 is similar to FIG. 2, but viewed from another aspect.

Referring also to FIGS. 2-3, the first component 20 includes a top case 210 facing the second component 25, and a base 220 secured to the top case 210. In the embodiment, the base 220 is arranged at the middle of a rear edge 213 of the top case 210. The base 220 includes a first end 221 and a second end 222 opposite to the first end 221. When viewed from an outer surface 211 of the top case 210, the first end 221 of the base 220 protrudes out of the front surface 211; when viewed from an inner surface 212 of the top case 210, the first end 221 of the base 220 is recessed in the inner surface 212 of the base 510 to form a receiving groove 223.

Two protruding posts 224 are secured to an end of the first end 221 opposite to the inner surface 212. The protruding posts 224 are spaced from each other and are aligned parallel to the rear edge 213 of the top case 210. The first end 221 further defines two through holes 225 communicating with the receiving groove 223. The through holes 225 are aligned with the protruding posts 224 and are arranged at opposite sides of the protruding posts 224. When viewed from the inner surface 212 of the top case 210, a limiting block 226 perpendicularly extends from the bottom wall of the receiving groove 223. The limiting block 226 is arranged between the through holes 225. Two protrusions 227 protrude from opposite sidewalls of the receiving groove 223 and connect with the bottom wall of the receiving groove 223. The protrusions 227 are aligned with the through hole and the limiting block 226.

The first component 20 further includes a cover 230. The cover 230 covers the base 220 to hide the protruding components and/or holes, and to enhance integrity of the electronic device 100.

The connecting mechanism 30 is used for rotatably securing the second component 25 to the first component 20. The connecting mechanism 30 includes a hinge 310 secured to the first end 221 and a pivoting rod 320 secured to the second end 222. The hinge 310 includes a fixing plate 313 secured to the first end 221, a shaft 314 fixed to an end of the fixing plate 313, and a connecting portion 318 rotatably coupled to the shaft 314 and secured to the second component 25. The fixing plate 313 defines two limiting holes 315 corresponding to the limiting posts 224 and two round holes 316 corresponding to the through holes 225. The shaft 314 is coaxial with the pivoting rod 320. The connecting portion 318 defines a plurality of fixing holes 319.

The fixing mechanism 40 includes a latching member 410 received in the receiving groove 223 and a fixing member 420 engaging with the latching member 410. The cross section of the latching member 410 is substantially U-shaped. The latching member includes a base plate 412 and two stopping plates 416. The base plate 412 is substantially rectangular, and defines two latching holes 413 corresponding to the through holes 225 and an opening 414 arranged between the latching holes 413 and corresponding to the limiting block 226. The latching holes 413 are adapted to receive an end of the fixing member 420 to latch the fixing member 420 to the latching member 410. When the latching member 410 is received in the receiving groove 223, the opening 414 receives the limiting block 226 to prevent the latching member 410 from rotating relative to the top case 210. Two recesses 418 are defined at opposite ends of the base plate 412. The recesses 418 respectively correspond to and receive the protrusions 227 to prevent the latching member 410 from moving in a direction parallel to the top case 210. The stopping plates 416 are parallel with each other and extend from opposite rims of the base plate 412. The stopping plates 416 abut opposite sidewalls of the receiving groove 223 to cooperate with the limiting block 226 to prevent the latching member 410 from rotating.

The second component 25 is rotatably coupled to the first component 20 by the hinge 310 and the pivoting rod 320. An end of the second component 25 corresponding to the rear edge 213 defines a receiving portion 252 for receiving the base 220. A sidewall of the receiving portion 252 defines a pivoting hole 254 for rotatably receiving the pivoting rod 320. The bottom wall of the receiving portion 252 defines a plurality of threaded holes 256 corresponding to the fixing holes 319 respectively.

Figure 4:
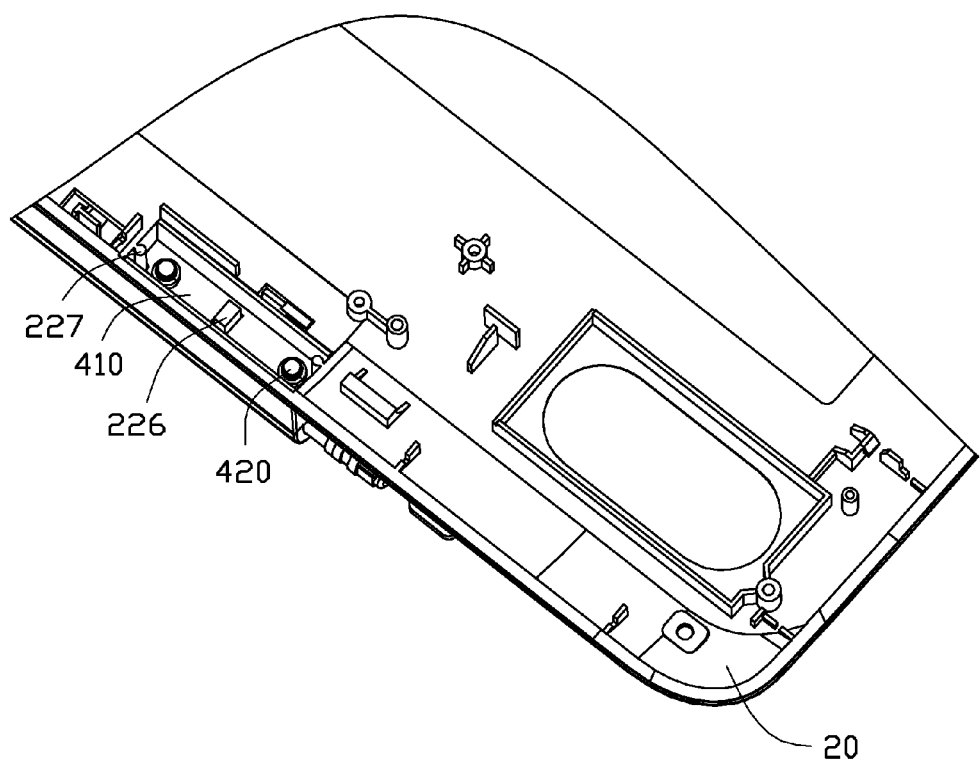
FIG. 4 is a partial assembly view of the electronic device of FIG. 2.
Figure 5:
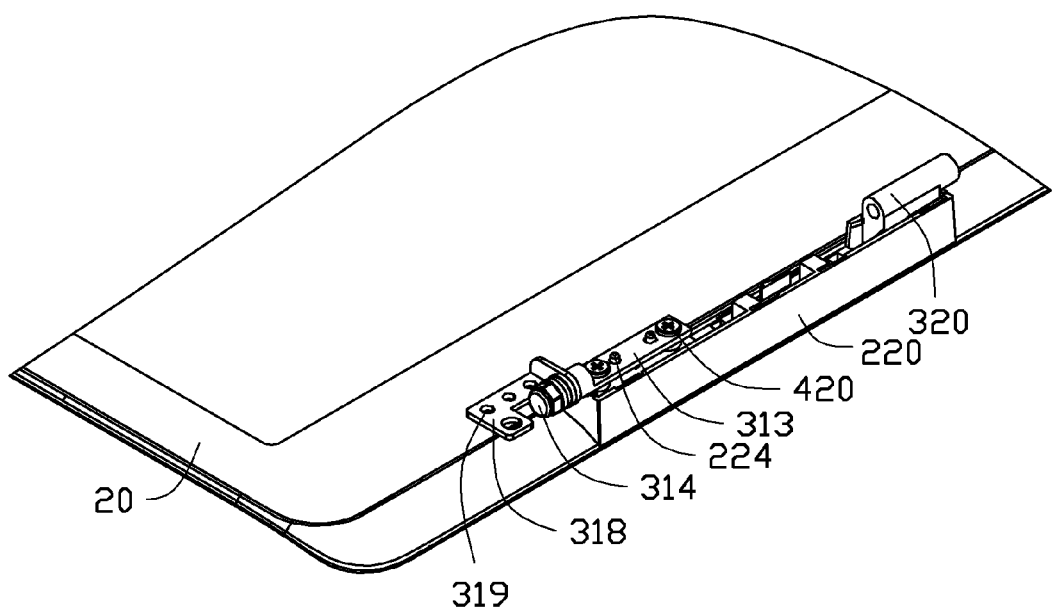
FIG. 5 is similar to FIG. 4, but viewed from another aspect.

Referring to FIGS. 4-5, in assembly, the latching member 410 is received in the receiving groove 223, with the opening 414 receiving the limiting block 226 and the recesses 418 receiving the protrusions 227. The limiting posts 224 are received in the corresponding limiting holes 315, and the round holes 316 correspond to the through holes 225. The fixing members 420 extend through the round holes 316 and the through holes 225, and further threadedly engage with the latching holes 413 to clasp the fixing plate 313 between the head portion 422 and the first end 221, thus, the hinge 310 is secured to the base 220. Finally, the pivoting rod 320 is received in the pivoting hole 252, and the connecting plate 318 is secured to the second component 25, such that the second component 25 is rotatably coupled to the first component 20.

By virtue of the fixing mechanism 40, the hinge 310 is easily secured to the first component 20 without holt-melting, which is safer for the electronic device 100.

It is to be understood, even though information as to, and advantages of, the present embodiments have been set forth in the foregoing description, together with details of the structures and functions of the present embodiments, the disclosure is illustrative only; and that changes may be made in detail, especially in the matters of shape, size, and arrangement of parts within the principles of the present embodiments to the full extent indicated by the broad general meaning of the terms in which the appended claims are expressed.

What is claimed is:

1. An electronic device, comprising:
   a first component comprising a base defining at least one through hole;
   a hinge defining at least one round hole corresponding to the at least one through hole; and
   a fixing mechanism for securing the hinge to the first component, the fixing mechanism comprising a latching member and at least one fixing member capable of extending through the at least one through hole and the at least one round hole;
   wherein the latching member defines at least one latching hole corresponding to the at least one round hole; the at least one fixing member orderly extends through the at least one round hole and the at least one through hole, and further engages with the at least one latching holes to secure the hinge to the first component, with the base being clasped between the hinge and the latching member.

2. The electronic device of claim 1, wherein the base comprises a first end and a second end opposite to the first end, the hinge is secured to the first end.

3. The electronic device of claim 2, wherein the at least one through hole is defined at the first end.

4. The electronic device of claim 3, wherein the first end is recessed in an inner surface of the first component opposite to the base to define a receiving groove communicating with the at least one through hole and used for receiving the latching member.

5. The electronic device of claim 4, wherein a limiting block is secured to a bottom wall of the receiving groove.

6. The electronic device of claim 5, wherein the latching member further defines an opening corresponding to the limiting block, the opening receives the limiting block to prevent the latching member from rotating relative to the base.

7. The electronic device of claim 4, wherein at least one protrusion protrudes from a sidewall of the receiving groove, the latching member further defines at least one recess for receiving the at least one protrusion.

8. The electronic device of claim 2, wherein the hinge comprises a fixing portion secured to the first end, a shaft fixed to the fixing portion, and a connecting portion rotatably coupled to the shaft.

9. The electronic device of claim 8, wherein the at least one round hole is defined at the fixing portion.

10. The electronic device of claim 8, further comprising a second component secured to the connecting portion.

11. The electronic device of claim 9, wherein a pivoting rod is secured to the second end and is coaxial with the shaft, the second component defines a pivoting hole for rotatably receiving the pivoting rod.

12. The electronic device of claim 8, wherein at least one limiting post protrudes from the first end, the fixing portion defines at least one limiting hole corresponding to and receiving the at least one limiting post.

* * * * *